United States Patent
O'Neil et al.

(10) Patent No.: US 10,962,069 B2
(45) Date of Patent: Mar. 30, 2021

(54) SEGMENTED RIVETLESS WEAR LINER WITH STRUCTURAL CARBON OR CERAMIC CORE

(71) Applicant: GOODRICH CORPORATION, Charlotte, NC (US)

(72) Inventors: Matthew R. O'Neil, Tipp City, OH (US); Ramesh Kurup, Centerville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 131 days.

(21) Appl. No.: 16/359,734

(22) Filed: Mar. 20, 2019

(65) Prior Publication Data

US 2020/0300317 A1  Sep. 24, 2020

(51) Int. Cl.
  *F16D 65/12* (2006.01)
  *F16D 69/04* (2006.01)
  *F16D 65/02* (2006.01)
  *F16D 69/00* (2006.01)

(52) U.S. Cl.
  CPC ......... *F16D 65/122* (2013.01); *F16D 65/121* (2013.01); *F16D 69/04* (2013.01); *F16D 2065/1312* (2013.01); *F16D 2065/1316* (2013.01); *F16D 2065/1324* (2013.01); *F16D 2069/004* (2013.01)

(58) Field of Classification Search
  CPC ...... F16D 62/122; F16D 65/121; F16D 69/04; F16D 55/36; F16D 2065/132; F16D 69/02; F16D 2250/0084; F16D 69/0408; F16D 65/122; F16D 2065/1312; F16D 2065/1316; F16D 2065/1324; F16D 2069/004

USPC .............................. 188/218 XL, 218 R, 71.5
See application file for complete search history.

(56) References Cited

U.S. PATENT DOCUMENTS

| 3,422,936 | A | * | 1/1969 | Marcheron | ........... F16D 65/122 188/218 XL |
| 3,710,914 | A | | 1/1973 | Lowey et al. | |
| 3,724,613 | A | * | 4/1973 | Bermingham | ........ F16D 69/027 188/218 XL |
| 7,090,057 | B2 | | 8/2006 | Fryska et al. | |
| 7,159,698 | B2 | | 1/2007 | Banks et al. | |

(Continued)

FOREIGN PATENT DOCUMENTS

| DE | 10154334 | 5/2003 |
| FR | 2326623 | 4/1977 |

OTHER PUBLICATIONS

European Patent Office, European Search Report dated Jun. 25, 2020 in Application No. 19215167.8.

*Primary Examiner* — Pamela Rodriguez
(74) *Attorney, Agent, or Firm* — Snell & Wilmer LLP (57) ABSTRACT

A friction disk includes a friction disk core having an inner diameter edge, an outer diameter edge, and a first surface with multiple mortises extending radially across the first surface, each of the multiple mortises having a different dimension at the inner diameter edge than at the outer diameter edge. The friction disk further includes a first wear liner having two wear liner segments each including a wear surface and a non-wear surface having a tenon with a complimentary shape to each of the multiple mortises, the tenon being configured to be received by a corresponding mortise of the multiple mortises to couple the wear liner segments to the friction disk core to form an annular liner.

19 Claims, 5 Drawing Sheets

(56) References Cited

U.S. PATENT DOCUMENTS

| | | |
|---|---|---|
| 7,766,133 B2 | 8/2010 | Cress |
| 8,281,907 B2 | 10/2012 | Fryska et al. |
| 9,541,145 B2 | 1/2017 | Kirkpatrick |
| 10,040,543 B2 | 8/2018 | Enright |
| 10,094,439 B2 | 10/2018 | Charles et al. |
| 2006/0016646 A1* | 1/2006 | Banks .................. F16D 65/122 188/218 XL |
| 2018/0252284 A1 | 9/2018 | Charles et al. |
| 2019/0017562 A1 | 1/2019 | Fiala et al. |
| 2020/0240486 A1* | 7/2020 | O'Neil .................. F16D 55/24 |

* cited by examiner

SEGMENTED RIVETLESS WEAR LINER WITH STRUCTURAL CARBON OR CERAMIC CORE

FIELD

The present disclosure relates to braking systems, and more specifically to wear liners for friction disks of aircraft braking systems.

BACKGROUND

Aircraft brake systems typically employ a series of friction disks forced into contact with each other to stop the aircraft. Friction disks splined to a non-rotating wheel axle are interspersed with friction disks splined to the rotating wheel. The friction disks withstand and dissipate the heat generated from contact between one another during braking. Current disk assemblies may comprise replaceable wear liners coupled to a reusable core. The liner may be attached to the core via a flange disposed at either an outer diameter of the liner for rotor assemblies or an inner diameter of the liner for stator assemblies. Attaching the liners via a flange can present torque transfer problems, particularly, when the liner is in a worn state. Additionally, use of a single piece wear liner may have drawbacks such as experiencing warping. Additionally, manufacturing a single piece wear liner may be relatively wasteful as an entire disk may be formed and then the center of the disk may be removed, such that the center disk of the wear liner is wasted. Also, use of rivets to fasten wear liners to the reusable core may undesirably increase part count, thus increasing cost, manufacture time, and overhaul time.

SUMMARY

Described herein is a friction disk having a friction disk core having an inner diameter edge, an outer diameter edge, and a first surface with multiple mortises extending radially across the first surface, each of the multiple mortises having a different dimension at the inner diameter edge than at the outer diameter edge. The friction disk further includes a first wear liner having two wear liner segments each including a wear surface and a non-wear surface having a tenon with a complimentary shape to each of the multiple mortises, the tenon being configured to be received by a corresponding mortise of the multiple mortises to couple the wear liner segments to the friction disk core to form an annular liner.

Any of the foregoing embodiments may further include a second wear liner having identical features as the first wear liner, wherein the friction disk core has a second surface with second mortises being identical to the multiple mortises of the first surface, and wherein the second wear liner is configured to be coupled to the second surface of the friction disk core via the second mortises.

In any of the foregoing embodiments, the first wear liner is configured to be coupled to the friction disk core without use of fasteners.

In any of the foregoing embodiments, the multiple mortises and the tenon have complimentary dovetail shapes.

In any of the foregoing embodiments, the friction disk core is a rotor core and each of the multiple mortises has a greater dimension at the inner diameter edge than at the outer diameter edge.

In any of the foregoing embodiments, the friction disk core is a stator core and each of the multiple mortises has a greater dimension at the outer diameter edge than at the inner diameter edge.

In any of the foregoing embodiments, the friction disk core includes a first material, and the first wear liner comprises a second material that may be different from the first material.

In any of the foregoing embodiments, the first wear liner includes at least three wear liner segments.

Also disclosed is a friction disk having a friction disk core having an inner diameter edge, an outer diameter edge, and a first surface with multiple mortises extending radially across the first surface, each of the multiple mortises having a different dimension at the inner diameter edge than at the outer diameter edge. The friction disk further includes a first wear liner having a first wear liner segment and a second wear liner segment each including a wear surface and a non-wear surface having a tenon with a complimentary shape to each of the multiple mortises, the tenon being configured to be received by a corresponding mortise of the multiple mortises to couple the first wear liner segment and the second wear liner segment to the friction disk core without use of fasteners to form an annular liner.

Any of the foregoing embodiments may further include a second wear liner having identical features as the first wear liner, wherein the friction disk core has a second surface with second mortises being identical to the multiple mortises of the first surface, and wherein the second wear liner is configured to be coupled to the second surface of the friction disk core via the second mortises.

In any of the foregoing embodiments, the multiple mortises and the tenon have complimentary dovetail shapes.

In any of the foregoing embodiments, the friction disk core is a rotor core and each of the multiple mortises has a greater dimension at the inner diameter edge than at the outer diameter edge.

In any of the foregoing embodiments, the friction disk core is a stator core and each of the multiple mortises has a greater dimension at the outer diameter edge than at the inner diameter edge.

In any of the foregoing embodiments, the friction disk core includes a first material, and the first wear liner comprises a second material that is different from the first material.

In any of the foregoing embodiments, the first wear liner includes at least three wear liner segments.

Also disclosed is a multi-disk brake system having a plurality of rotors configured to rotate about an axis and a plurality of stators configured to remain stationary relative to the axis. At least one of the plurality of rotors or the plurality of stators includes a friction disk core having an inner diameter edge, an outer diameter edge, and a first surface with multiple mortises extending radially across the first surface, each of the multiple mortises having a different dimension at the inner diameter edge than at the outer diameter edge, and a first wear liner having two wear liner segments each including a wear surface and a non-wear surface having a tenon with a complimentary shape to each of the multiple mortises, the tenon being configured to be received by a corresponding mortise of the multiple mortises to couple the wear liner segments to the friction disk core to form an annular liner.

In any of the foregoing embodiments, the at least one of the plurality of rotors or the plurality of stators further includes a second wear liner having identical features as the first wear liner, wherein the friction disk core has a second surface with second mortises being identical to the multiple mortises of the first surface, and wherein the second wear liner is configured to be coupled to the second surface of the friction disk core via the second mortises.

In any of the foregoing embodiments, the first wear liner is configured to be coupled to the friction disk core without use of fasteners.

In any of the foregoing embodiments, the friction disk core is a rotor core of the plurality of rotors and each of the multiple mortises has a greater dimension at the inner diameter edge than at the outer diameter edge.

In any of the foregoing embodiments, the friction disk core is a stator core of the plurality of stators and each of the multiple mortises has a greater dimension at the outer diameter edge than at the inner diameter edge.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In the case of components that rotate about a common axis, a first component that is "radially outward" of a second component means that the first component is positioned at a greater distance away from the common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

Disclosed herein, according to various embodiments, are segmented wear liners for friction disks (e.g., rotors and stators) of a braking system. The friction disks may include a friction disk core with wear liners coupled to the friction disk core. As described in greater detail below, the wear liner may be segmented and each segment may include one or more tenon for coupling the wear liner segment to the friction disk core without use of fasteners. The wear liners may be positioned to provide frictional contact with adjacent friction disks during braking. Separate wear liners may be formed for rotor and for stator friction disks. In other words, the wear liners may be incompatible with both rotor cores and stators cores. Because the wear liners may be replaced after wear, use of tenons and mortises to couple the wear liners to the cores reduces overhaul time of replacing the wear liners. Additionally, the cost of the liners may be reduced due to the reduced part count (i.e., no fasteners are required for assembly). Because the wear liners are segmented (as opposed to being a single, annular structure) warping of the wear liners may be reduced, which occurs when non-segmented wear liners are used in a disk brake system. The segmented aspect of the wear liners further reduces waste during the manufacturing process because the wear liner segments may be manufactured without waste (as opposed to non-segmented wear liners which are formed as a disk, then cut to form the annular shape).

Figure 1:
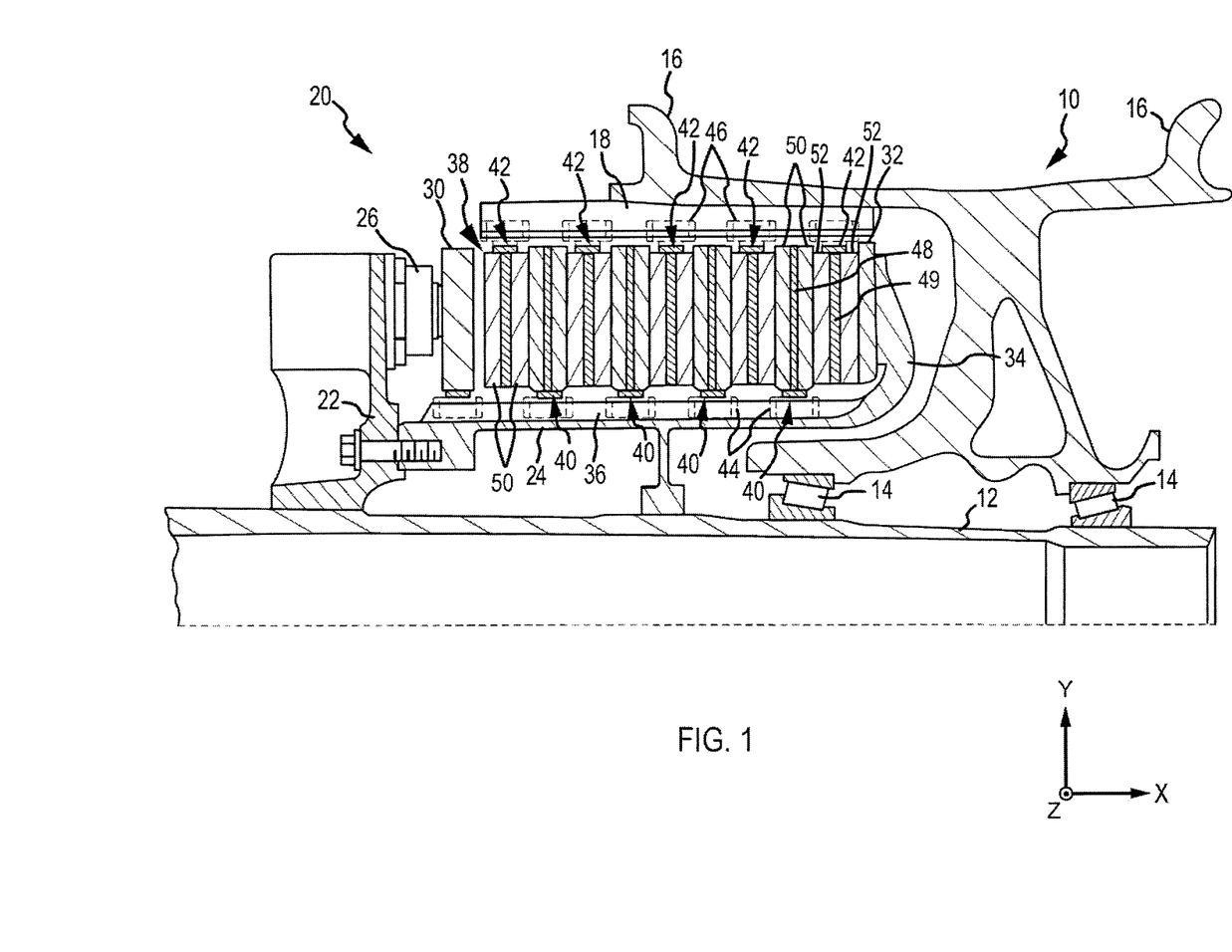
FIG. 1 illustrates a cross-sectional view of a multi-disk brake system, in accordance with various embodiments.

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof described herein, and any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk brake system 20. Multi-disk brake system 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 1, or attached as separate components.

Multi-disk brake system 20 also includes a plurality of friction disks 38. Each friction disk 38 may comprise a friction disk core. The plurality of friction disks 38 includes at least one friction disk with a non-rotatable core, also known as a stator 40, and at least one friction disk with a rotatable core, also known as a rotor 42. Stators 40 and rotors 42 may be located adjacent to one another in multi-disk brake system 20, forming a plurality of adjacent stator-rotor pairs. Stators 40 may comprise a stator core 48 and wear liners 50. Rotors 42 may comprise a rotor core 49 and wear liners 52. Each friction disk 38 includes an attachment structure. In the embodiment of FIG. 1, each of the four stators 40 includes a plurality of stator lugs 44 at circumferentially spaced positions around stator 40 as an attachment structure. Similarly, each of the five rotors 42 includes a plurality of rotor lugs 46 at circumferentially spaced positions around rotor 42 as an attachment structure. In the embodiment of FIG. 1, pressure plate 30, end plate 32, and friction disks 38 are all annular structures made at least partially from a carbon composite material.

Torque flange 22 may be mounted to axle 12. Torque tube 24 is bolted to torque flange 22 such that reaction plate 34 is near an axial center of wheel 10. End plate 32 is connected to a surface of reaction plate 34 facing axially inward. Thus, end plate 32 is non-rotatable by virtue of its connection to torque tube 24. Stator splines 36 support pressure plate 30 so that pressure plate 30 is also non-rotatable. Stator splines 36 also support stators 40 via stator cores 48. Stator cores 48 engage stator splines 36 with gaps formed between stator lugs 44. Similarly, rotors 42 engage rotor splines 18 via rotor core 49 with gaps formed between rotor lugs 46. Thus, rotor cores 49 of rotors 42 are rotatable by virtue of their engagement with rotor splines 18 of wheel 10.

As shown in FIG. 1, rotors 42 with rotor cores 49 are arranged with end plate 32 on one end, pressure plate 30 on the other end, and stators 40 with stator cores 48 interleaved so that rotors 42 with rotor cores 49 are directly or indirectly adjacent to non-rotatable friction components. Pistons 26 are connected to torque flange 22 at circumferentially spaced positions around torque flange 22. Pistons 26 face axially toward wheel 10 and contact a side of pressure plate 30 opposite friction disks 38. Pistons 26 may be powered electrically, hydraulically, or pneumatically.

In various embodiments, in response to actuation of pistons 26, a force, towards reaction plate 34, is exerted on the rotatable friction disks 42 and the non-rotatable friction disks 40. The rotatable friction disks 42 and the non-rotatable friction disks 40 may thus be pressed together between pressure plate 30 and end plate 32.

Figure 2A:
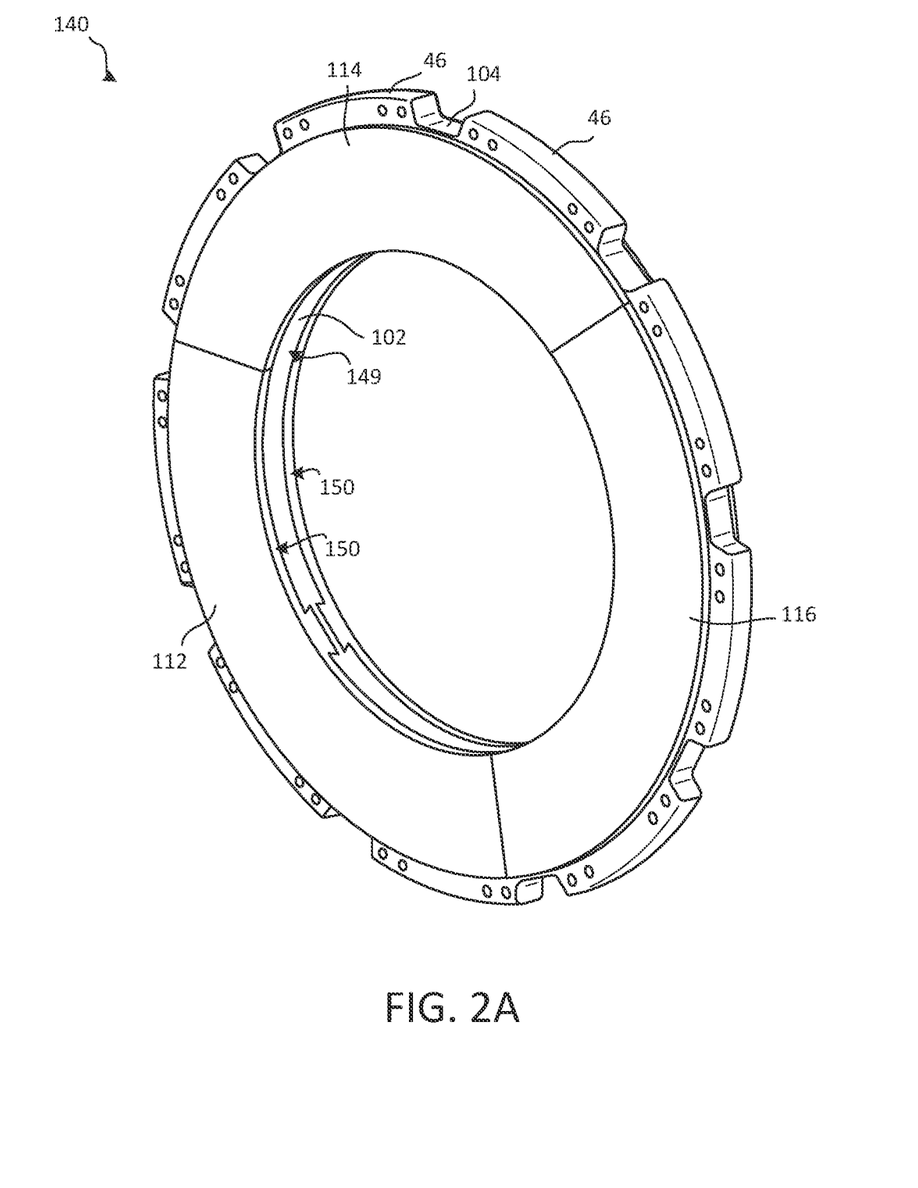
FIG. 2A illustrates a perspective view of a friction disk having wear liners disposed on opposing surfaces of the friction disk core, according to various embodiments.

FIG. 2A illustrates a perspective view of a friction disk 140 having segmented wear liners 150 disposed on opposing surfaces of the friction disk core 149, according to various embodiments. Friction disk 140 may be a stator or a rotor, such as stator 48 or rotor 49 described above with reference to FIG. 1. In various embodiments, wear liners 150 may be replaceable, such that after wear liners 150 have been worn below a suitable operational thickness, wear liners 150 may be removed from friction disk core 149 and replaced by new or remanufactured wear liners. As mentioned above, wear liners 150 may be segmented wear liners. In that regard, wear liners 150 may include any quantity of segments such as 2 segments, 3 segments (as shown), 4 segments, or the like. Wear liners 150 may include a first segment 112, a second segment 114, and a third segment 116. When coupled to friction disk core 149, segments 112, 114, 116 may together form an annular structure used as wear liner 150.

Each of wear liner segments 112, 114, 116 may be coupled to friction disk core 149 via one or more tenon and mortise. That is, each wear liner segment 112, 114, 116 may include a tenon, and friction disk core 149 may include at least one mortise to receive a tenon from a corresponding wear liner segment 112, 114, 116. Use of a tenon and mortise allows wear liners 150 to be coupled to friction disk core 149 without use of fasteners. This arrangement reduces part count, thus reducing manufacturing time and manufacturing cost. This arrangement further results in reduced replacement time of wear liners 150 (i.e., reduced overhaul).

Friction disk core 149 and wear liners 150 may comprise different materials. For example, friction disk core 149 may comprise a first material (e.g., steel or a carbon composite material) and wear liners 150 may comprise a second material (e.g., a carbon composite material or ceramic). In various embodiments, friction disk core 149 and wear liners 150 may comprise the same material, such as a carbon composite material. In various embodiments, the material of friction disk core 149 may be selected for its structural properties, thermal conductivity, heat capacity, and/or oxidation resistance properties. For example, friction disk core 149 may comprise silicon carbide or titanium. In various embodiments, a material of wear liners 150 may be selected for its wear resistance and/or frictional properties. Thus, friction disk 140 may contain the structural advantages of friction disk core 149 and the frictional advantages of wear liners 150.

Figure 2B:
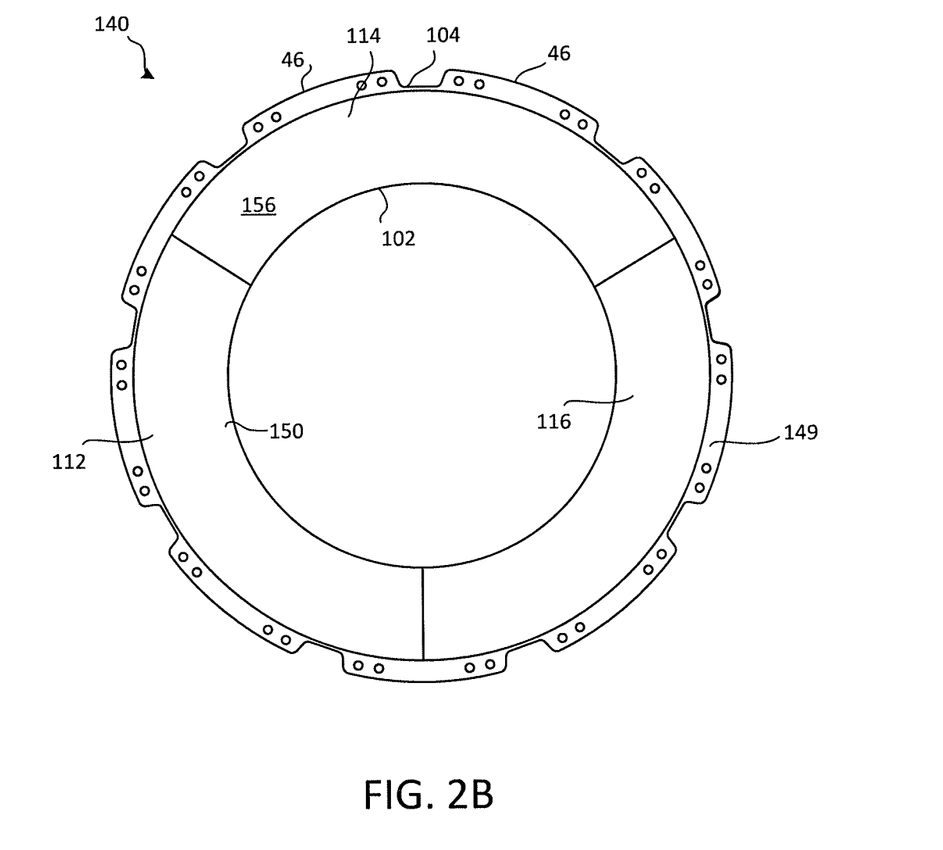
FIG. 2B illustrates a plan view of a wear liner disposed on a friction disk core, with fasteners coupling the wear liner to the friction disk core, according to various embodiments.

With reference to FIGS. 2A and 2B, friction disk core 149 may comprise a rotor spine and rotor lugs 46. Friction disk core 149 may engage rotor splines 18 (FIG. 1) in rotor gaps formed between rotor lugs 46. Thus, friction disk 140 may be rotatable by virtue of the engagement between rotor lugs 46 of friction disk core 149 and rotor splines 18 of wheel 10 (FIG. 1). Friction disk core 149 may comprise an inner circumferential surface 102 and an outer circumferential surface 104 radially outward of inner circumferential surface 102. Rotor lugs 46 may be extend from outer circumferential surface 104. With momentary reference to FIG. 3, friction disk core 149 further comprises a first surface 106 and a second surface 108 opposite first surface 106. First surface 106 and second surface 108 may extend along rotor spine 110 between inner circumferential surface 102 and outer circumferential surface 104. First surface 106 and second surface 108 may have identical features.

Figure 3:
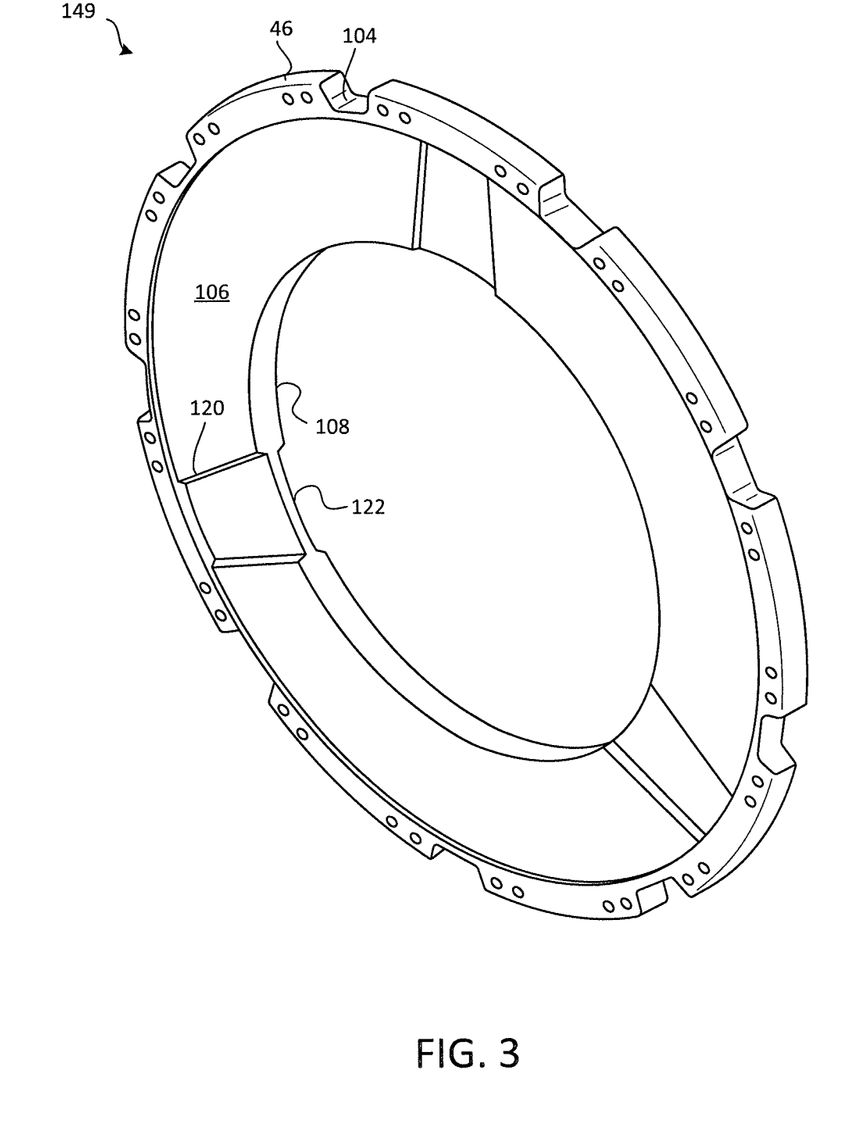
FIG. 3 illustrates a perspective view of a friction disk core defining a plurality of channels for receiving a corresponding plurality of torque ribs of a wear liner, according to various embodiments.

FIG. 3 illustrates a perspective view of friction disk core 149 having a plurality of mortises 120 each designed to receive a corresponding tenon (e.g., tenon 202 of FIG. 4A) of wear liner segments 112, 114, 116, according to various embodiments. That is, a plurality of first mortises 120 may be formed in, and defined by, first surface 106 of the friction disk core 149. A plurality of second mortises 122 may be formed in, and defined by, second surface 108 of the friction disk core 149. In various embodiments, the mortises 120, 122 are recesses or depressions formed in the surface of the friction disk core 149 that is configured to face/engage the non-wear surface of the wear liners. In various embodiments, the mortises 120, 122 are circumferentially distributed and are configured to be aligned with corresponding/complementary tenons of the wear liners 150. This engagement between tenons and mortises 120 may facilitate torque transfer between the friction disk core 149 and the wear liners 150.

In various embodiments, the mortises 120, 122 may be axially aligned, as shown in FIG. 3. In various embodiments, however, the mortises 120, 122 may be spaced apart from each other (i.e., the mortises 120, 122 may fail to be axially aligned) in order to avoid having a section of the friction disk core 149 having a thickness that is reduced by the axial lengths of both mortises 120, 122.

Each mortise 120, 122 may be formed partially through friction disk core 149 such that a portion of friction disk core 149 remains between a bottom, or axially inward, surface of the mortises 120, 122. Stated differently, a depth of first mortises 120 and a depth of second mortises 122 may be selected such that a portion of friction disk core 149 remains between axially aligned first mortises 120 and second mortises 122. In various embodiments, the circumferential positions of the first mortises 120 are aligned with the circumferential positions of the second mortises 122. In various embodiments, the depth of the first mortises 120 may be about equal to the depth of second mortises 122.

With continued reference to FIG. 3, first mortises 120 and second mortises 122 may extend radially. That is, sidewalls 126 of the mortises 120, 122 may extend along or may be parallel to radii of the friction disk core 149. The sidewalls of the mortises 120, 122 may extend substantially axially, and thus may be substantially perpendicular to the first and second surfaces 106, 108 of the friction disk core 149. In various embodiments, sidewalls 126 of first mortises 120 and second mortises 122 may be angled to form a dovetail shape (shown in detail in FIG. 4C).

Figure 4A:
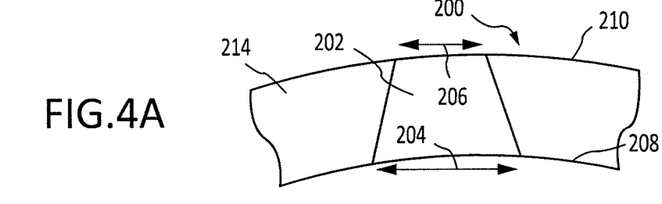
FIG. 4A illustrates an axial view of a wear liner segment having a tenon, according to various embodiments.
Figure 4B:
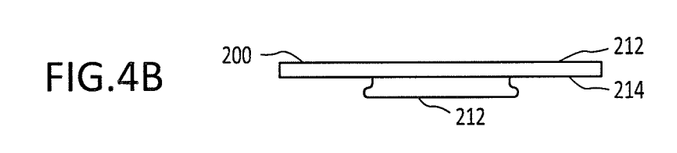
FIG. 4B illustrates a radial view of the wear liner segment of FIG. 4A, according to various embodiments.

In various embodiments, and with reference to FIGS. 4A and 4B, an axial view and a radial view, respectively, of a wear liner segment 200 are shown. As shown, wear liner segment 200 has a wear surface 212 designed to contact an adjacent friction disk and a non-wear surface 214 designed to be coupled to a friction disk core (e.g., friction disk core 250 of FIGS. 4C and 4D). Wear liner segment 200 further includes an inner diameter edge 208 and an outer diameter edge 210. Wear surface 212 may have a relatively planar shape to facilitate generation of friction between wear surface 212 and an adjacent wear surface.

Wear liner segment 200 includes a tenon 202 extending away from non-wear surface 214. Tenon 202 extends in the axial direction and may taper towards non-wear surface 214 from an end of tenon 202. That is, tenon 202 may have a dovetail shape. Tenon 202 also tapers towards outer diameter edge 210 from inner diameter edge 208. That is, tenon 202 has a dimension 204 at inner diameter edge 208 that is greater than a dimension 206 at outer diameter edge 210.

Figure 4C:
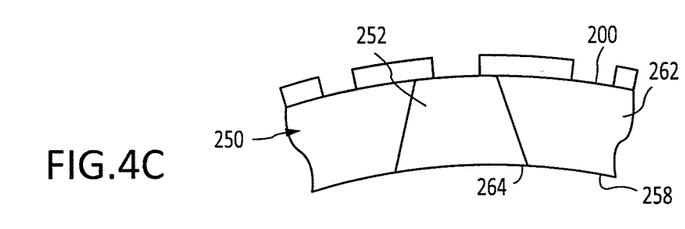
FIG. 4C illustrates an axial view of a rotor core having a mortise to receive the tenon of FIG. 4A, according to various embodiments.
Figure 4D:
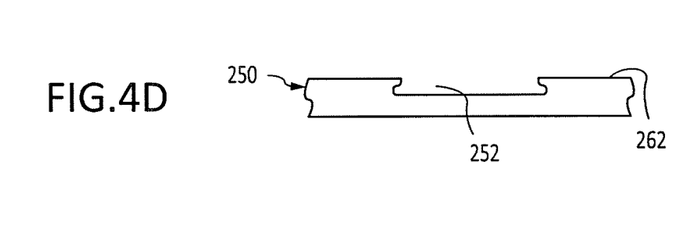
FIG. 4D illustrates a radial view of the rotor core of FIG. 4C, according to various embodiments.

FIG. 4C illustrates an axial view of a friction disk core 250, and FIG. 4D illustrates a radial view of friction disk core 250. Referring to FIGS. 4A, 4B, 4C, and 4D, wear liner segment 200 is designed to be coupled to friction disk core 250 via tenon 202 of wear liner segment 200 and a corresponding mortise 252 of friction disk core 250. As shown, mortise 252 includes a depression, channel, or similar feature formed in a surface 262. Mortise 252 has a shape that corresponds to tenon 202 and may be tapered axially and radially in a corresponding shape to tenon 202. In that regard, tenon 202 may be received by mortise 252 to couple wear liner segment 200 to friction disk core 250. Wear liner segment 200 may be coupled to friction disk core 250 by inserting tenon 202 into mortise 252. Due to the taper in the radial direction of tenon 202 and mortise 252, tenon 202 may be inserted into mortise 252 by first placing outer diameter edge 210 of tenon 202 into an inner diameter edge 264 of mortise 252 then sliding tenon 202 into mortise 252.

Friction disk core 250 may be a rotor core. In that regard, rotation of friction disk core 250 may generate centrifugal force from inner diameter edge 208 towards outer diameter edge 210. Due to the taper of tenon 202 and mortise 252 from inner diameter edge 208 towards outer diameter edge 210, mortise 252 resists this centrifugal force.

Using tenon 202 and mortise 252 to couple wear liner segment 200 to friction disk core 250 provides various advantages. For example, such coupling may be performed without use of fasteners, which reduces manufacturing cost and time. Additionally, in response to wear liner segment 200 becoming worn, wear liner segment 200 may be removed from friction disk core 250 by sliding wear liner segment 200 from friction disk core 250 which significantly reduces the replacement time because removal of fasteners is unnecessary.

Figure 5A:
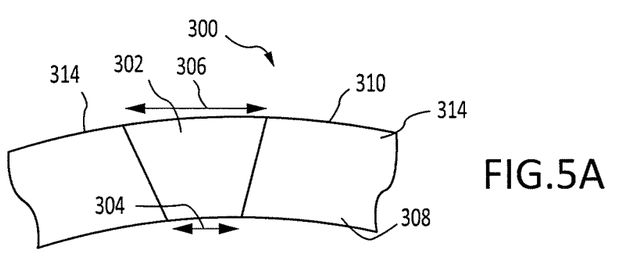
FIG. 5A illustrates an axial view of a wear liner segment having a tenon, according to various embodiments.
Figure 5B:
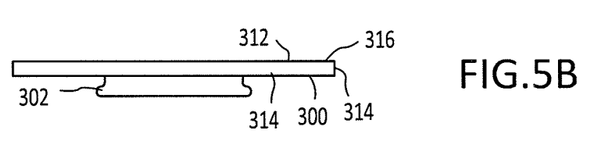
FIG. 5B illustrates a radial view of the wear liner segment of FIG. 5A, according to various embodiments.

In various embodiments, and with reference to FIGS. 5A and 5B, an axial view and a radial view, respectively, of a wear liner segment 300 are shown. As shown, wear liner segment 300 has a wear surface 312 designed to contact an adjacent friction disk and a non-wear surface 314 designed to be coupled to a friction disk core (e.g., friction disk core 350 of FIGS. 5C and 5D). Wear liner segment 300 further includes an inner diameter edge 308 and an outer diameter edge 310.

Wear liner segment 300 includes a tenon 302 extending away from non-wear surface 314. Tenon 302 extends in the axial direction and may taper towards non-wear surface 314 from an end of tenon 302. That is, tenon 302 may have a dovetail shape. Tenon 302 also tapers from outer diameter edge 310 towards inner diameter edge 308. That is, tenon 302 has a dimension 304 at inner diameter edge 308 that is less than a dimension 306 at outer diameter edge 310.

Figures 5C, 5D:
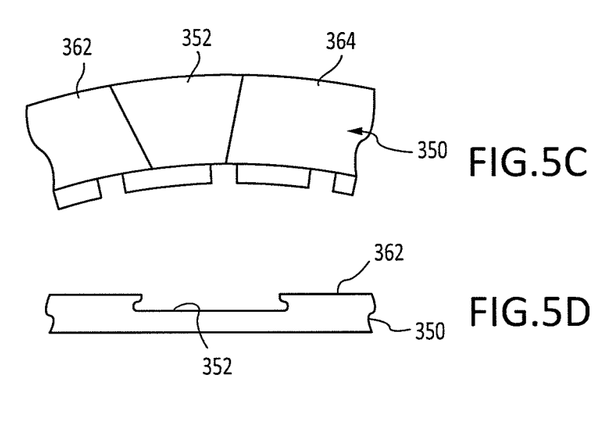
FIG. 5C illustrates an axial view of a stator core having a mortise to receive the tenon of FIG. 5A, according to various embodiments.
FIG. 5D illustrates a radial view of the stator core of FIG. 5C, according to various embodiments.

FIG. 5C illustrates an axial view of a friction disk core 350, and FIG. 5D illustrates a radial view of friction disk core 350. Referring to FIGS. 5A, 5B, 5C, and 5D, wear liner segment 300 is designed to be coupled to friction disk core 350 via tenon of wear liner segment 300 and a corresponding mortise 352 of friction disk core 350. As shown, mortise 352 includes a depression, channel, or similar feature formed in a surface 362. Mortise 352 has a shape that corresponds to tenon 302. In that regard, tenon 302 may be received by mortise 352 to couple wear liner segment 300 to friction disk core 350. Wear liner segment 300 may be coupled to friction disk core 350 by inserting tenon 302 into mortise 352. Due to the taper in the radial direction of tenon 302 and mortise 352, tenon 302 may be inserted into mortise 352 by first placing inner diameter edge 308 of tenon 202 into an outer diameter edge 364 of mortise 352.

Friction disk core 350 may be a stator core. In that regard, torque during brake application may generate a force from outer diameter edge 310 towards inner diameter edge 308. Due to the taper of tenon 302 and mortise 352 from outer diameter edge 310 towards inner diameter edge 308, mortise 352 resists this force.

As described above, friction disk core 350 includes mortise 352, and wear liner segment 300 includes tenon 302. However, in various embodiments, a friction disk core may include a tenon, and a wear liner segment may include a mortise. In various embodiments, a friction disk core may include tenons on one surface and mortises on another surface, both designed to mate with mortises and tenons, respectively, of corresponding wear liner segments.

Inclusions of tenons and mortises to couple wear liner segments 300 to friction disk cores provides an added advantage of resisting circumferential movement of wear liner segments 300 relative to friction disk cores. This resistance reduces the likelihood of a wear liner losing friction with an adjacent wear liner.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A friction disk comprising:
   a friction disk core having an inner diameter edge, an outer diameter edge, and a first surface with multiple mortises extending radially across the first surface, each of the multiple mortises having a different dimension at the inner diameter edge than at the outer diameter edge; and
   a first wear liner having two wear liner segments each including a wear surface and a non-wear surface having a tenon with a complimentary shape to each of the multiple mortises, the tenon being configured to be received by a corresponding mortise of the multiple mortises to couple the wear liner segments to the friction disk core to form an annular liner,
   wherein each of the multiple mortises has a depth that is less than half of a thickness of the friction disk core, and
   wherein each of the multiple mortises extend from the inner diameter edge of the friction disk core to the outer diameter edge of the friction disk core.

2. The friction disk of claim 1, further comprising a second wear liner having identical features as the first wear liner, wherein the friction disk core has a second surface with second mortises being identical to the multiple mortises of the first surface, and wherein the second wear liner is configured to be coupled to the second surface of the friction disk core via the second mortises.

3. The friction disk of claim 1, wherein the first wear liner is configured to be coupled to the friction disk core without use of fasteners.

4. The friction disk of claim 1, wherein the multiple mortises and the tenon have complimentary dovetail shapes.

5. The friction disk of claim 1, wherein the friction disk core is a rotor core and each of the multiple mortises has a greater dimension at the inner diameter edge than at the outer diameter edge.

6. The friction disk of claim 1, wherein the friction disk core is a stator core and each of the multiple mortises has a greater dimension at the outer diameter edge than at the inner diameter edge.

7. The friction disk of claim 1, wherein the friction disk core includes a first material, and the first wear liner comprises a second material that is different from the first material.

8. A friction disk comprising:
   a friction disk core having an inner diameter edge, an outer diameter edge, and a first surface with multiple mortises extending radially across the first surface, each of the multiple mortises having a different dimension at the inner diameter edge than at the outer diameter edge; and
   a first wear liner having a first wear liner segment and a second wear liner segment each including a wear surface and a non-wear surface having a tenon with a complimentary shape to each of the multiple mortises, the tenon being configured to be received by a corresponding mortise of the multiple mortises to couple the first wear liner segment and the second wear liner segment to the friction disk core without use of fasteners to form an annular liner,
wherein each of the multiple mortises has a depth that is less than half of a thickness of the friction disk core, and
wherein each of the multiple mortises extend from the inner diameter edge of the friction disk core to the outer diameter edge of the friction disk core.

9. The friction disk of claim 8, further comprising a second wear liner having identical features as the first wear liner, wherein the friction disk core has a second surface with second mortises being identical to the multiple mortises of the first surface, and wherein the second wear liner is configured to be coupled to the second surface of the friction disk core via the second mortises.

10. The friction disk of claim 8, wherein the multiple mortises and the tenon have complimentary dovetail shapes.

11. The friction disk of claim 8, wherein the friction disk core is a rotor core and each of the multiple mortises has a greater dimension at the inner diameter edge than at the outer diameter edge.

12. The friction disk of claim 8, wherein the friction disk core is a stator core and each of the multiple mortises has a greater dimension at the outer diameter edge than at the inner diameter edge.

13. The friction disk of claim 8, wherein the friction disk core includes a first material, and the first wear liner comprises a second material that is different from the first material.

14. The friction disk of claim 8, wherein the first wear liner includes at least three wear liner segments.

15. A multi-disk brake system comprising:
a plurality of rotors configured to rotate about an axis; and
a plurality of stators configured to remain stationary relative to the axis,
wherein at least one of the plurality of rotors or the plurality of stators includes:
a friction disk core having an inner diameter edge, an outer diameter edge, and a first surface with multiple mortises extending radially across the first surface, each of the multiple mortises having a different dimension at the inner diameter edge than at the outer diameter edge, and
a first wear liner having two wear liner segments each including a wear surface and a non-wear surface having a tenon with a complimentary shape to each of the multiple mortises, the tenon being configured to be received by a corresponding mortise of the multiple mortises to couple the wear liner segments to the friction disk core to form an annular liner,
wherein each of the multiple mortises has a depth that is less than half of a thickness of the friction disk core, and
wherein each of the multiple mortises extend from the inner diameter edge of the friction disk core to the outer diameter edge of the friction disk core.

16. The multi-disk brake system of claim 15, wherein the at least one of the plurality of rotors or the plurality of stators further includes a second wear liner having identical features as the first wear liner, wherein the friction disk core has a second surface with second mortises being identical to the multiple mortises of the first surface, and wherein the second wear liner is configured to be coupled to the second surface of the friction disk core via the second mortises.

17. The multi-disk brake system of claim 15, wherein the first wear liner is configured to be coupled to the friction disk core without use of fasteners.

18. The multi-disk brake system of claim 15, wherein the friction disk core is a rotor core of the plurality of rotors and each of the multiple mortises has a greater dimension at the inner diameter edge than at the outer diameter edge.

19. The multi-disk brake system of claim 15, wherein the friction disk core is a stator core of the plurality of stators and each of the multiple mortises has a greater dimension at the outer diameter edge than at the inner diameter edge.

* * * * *